United States Patent
Takasugi et al.

(10) Patent No.: US 12,519,119 B2
(45) Date of Patent: Jan. 6, 2026

(54) REGENERATIVE FUEL CELL SYSTEM

(71) Applicant: HONDA MOTOR CO., LTD., Tokyo (JP)

(72) Inventors: Shoji Takasugi, Wako (JP); Kazunori Fukuma, Wako (JP); Takumi Kawano, Wako (JP); Yuta Hoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 569 days.

(21) Appl. No.: 18/107,621

(22) Filed: Feb. 9, 2023

(65) Prior Publication Data

US 2023/0261231 A1   Aug. 17, 2023

(30) Foreign Application Priority Data

Feb. 14, 2022   (JP) .................. 2022-020130

(51) Int. Cl.
  *H01M 8/06*   (2016.01)
  *C25B 1/04*   (2021.01)
  (Continued)

(52) U.S. Cl.
  CPC ............. *H01M 8/0656* (2013.01); *C25B 1/04* (2013.01); *C25B 9/23* (2021.01); *C25B 15/08* (2013.01);
  (Continued)

(58) Field of Classification Search
  CPC ........... H01M 8/0656; H01M 8/04201; H01M 8/04291; H01M 8/0438; H01M 8/04753; H01M 8/186; H01M 8/04228; H01M 8/04303; C25B 9/23; C25B 1/04; C25B 15/08
  (Continued)

(56) References Cited

U.S. PATENT DOCUMENTS

2005/0118475 A1 * 6/2005 Ueda ................. H01M 8/04567
                                                429/513
2009/0123791 A1 * 5/2009 Takahashi ........... H01M 8/0681
                                                429/411
(Continued)

FOREIGN PATENT DOCUMENTS

JP   2011-149074 A   8/2011
JP   2013-060625 A   4/2013
JP   2016-015282 A   1/2016

OTHER PUBLICATIONS

Office Action dated Sep. 12, 2023 issued in the corresponding Japanese Patent Application No. 2022-020130 with the English machine translation thereof.

*Primary Examiner* — James M Erwin
(74) *Attorney, Agent, or Firm* — Carrier, Shende & Associates P.C.; Joseph P. Carrier; Fulchand P. Shende

(57) ABSTRACT

A regenerative fuel cell system includes a supply mechanism for supplying gas generated by a pressurization apparatus to a fuel cell, and a control apparatus. The supply mechanism includes a flow regulating valve provided in a gas supply path, and a pressure sensor that detects pressure of the gas supplied to the gas supply path. When a pressurization-stop operation is started, the control apparatus adjusts the flow rate of the flow regulating valve to realize a target depressurization rate, and causes the fuel cell to generate power corresponding to the flow rate.

6 Claims, 3 Drawing Sheets

(51) Int. Cl.
*C25B 9/23* (2021.01)
*C25B 15/08* (2006.01)
*H01M 8/04082* (2016.01)
*H01M 8/04291* (2016.01)
*H01M 8/0438* (2016.01)
*H01M 8/04746* (2016.01)
*H01M 8/0656* (2016.01)
*H01M 8/18* (2006.01)

(52) U.S. Cl.
CPC ... *H01M 8/04201* (2013.01); *H01M 8/04291* (2013.01); *H01M 8/0438* (2013.01); *H01M 8/04753* (2013.01); *H01M 8/186* (2013.01)

(58) Field of Classification Search
USPC .......................................................... 429/418
See application file for complete search history.

(56) References Cited

U.S. PATENT DOCUMENTS

| | | | |
|---|---|---|---|
| 2011/0180416 A1 | 7/2011 | Kurashina et al. | |
| 2013/0062215 A1 | 3/2013 | Kurashina et al. | |
| 2015/0140465 A1* | 5/2015 | Geneston .......... | H01M 8/04104 |
| | | | 429/446 |
| 2021/0384533 A1* | 12/2021 | Kawase ............ | H01M 8/04201 |
| 2023/0124256 A1* | 4/2023 | Sone ................ | H01M 8/04746 |
| | | | 429/429 |

* cited by examiner

REGENERATIVE FUEL CELL SYSTEM

CROSS-REFERENCE TO RELATED APPLICATIONS

This application is based upon and claims the benefit of priority from Japanese Patent Application No. 2022-020130 filed on Feb. 14, 2022, the contents of which are incorporated herein by reference.

BACKGROUND OF THE INVENTION

Field of the Invention

The present invention relates to a regenerative fuel cell system.

Description of the Related Art

JP 2016-015282 A discloses a regenerative fuel cell system that includes a fuel cell, a water electrolysis apparatus, and a gas storage tank. The fuel cell generates power using hydrogen and oxygen. The water electrolysis apparatus generates high-pressure hydrogen and oxygen by decomposing water. In the regenerative fuel cell system of JP 2016-015282 A, the water supplied to the water electrolysis apparatus is circulated in order to increase the efficiency of the water supply for the water electrolysis apparatus.

SUMMARY OF THE INVENTION

In general, when the water electrolysis apparatus transitions from a pressurization operation to a pressurization-stop operation, the gas generated during the pressurization-stop operation is discharged as exhaust. The pressurization operation is an operation of decomposing water to generate hydrogen and oxygen. The pressurization-stop operation is an operation from when stoppage of the pressurization operation starts to when this stoppage ends.

If it is possible to supply the gas generated during the pressurization-stop operation to the fuel cell, the gas generated by the water electrolysis apparatus is not discharged as exhaust, and this gas can therefore be used efficiently.

However, the pressure of the gas generated by the water electrolysis apparatus immediately after the pressurization-stop operation is high. Therefore, when the high-pressure gas generated during the pressurization-stop operation is supplied to the fuel cell, there is a concern that blisters or the like will occur in the electrolyte membrane of the water electrolysis apparatus and the water electrolysis apparatus will deteriorate.

The present invention has the object of solving the above problem.

An aspect of the present invention is a regenerative fuel cell system including a fuel cell configured to generate power through an electrochemical reaction between oxygen gas and hydrogen gas, the regenerative fuel cell system comprising: a pressurization apparatus configured to generate gas from among the oxygen gas having been pressurized and the hydrogen gas having been pressurized; a supply mechanism configured to supply the gas to the fuel cell; and a control apparatus, wherein the supply mechanism includes: a gas supply path configured to supply the gas from the pressurization apparatus to the fuel cell; a flow regulating valve provided in the gas supply path; and a pressure sensor configured to detect pressure of the gas supplied to the gas supply path, and when a pressurization-stop operation performed by the pressurization apparatus is started, the control apparatus adjusts a flow rate of the flow regulating valve based on the pressure to realize a target depressurization rate, and causes the fuel cell to generate power corresponding to the flow rate.

According to the aspect described above, it is possible for the fuel cell to generate power while restricting the occurrence of blisters in the electrolyte membrane of the pressurization apparatus.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
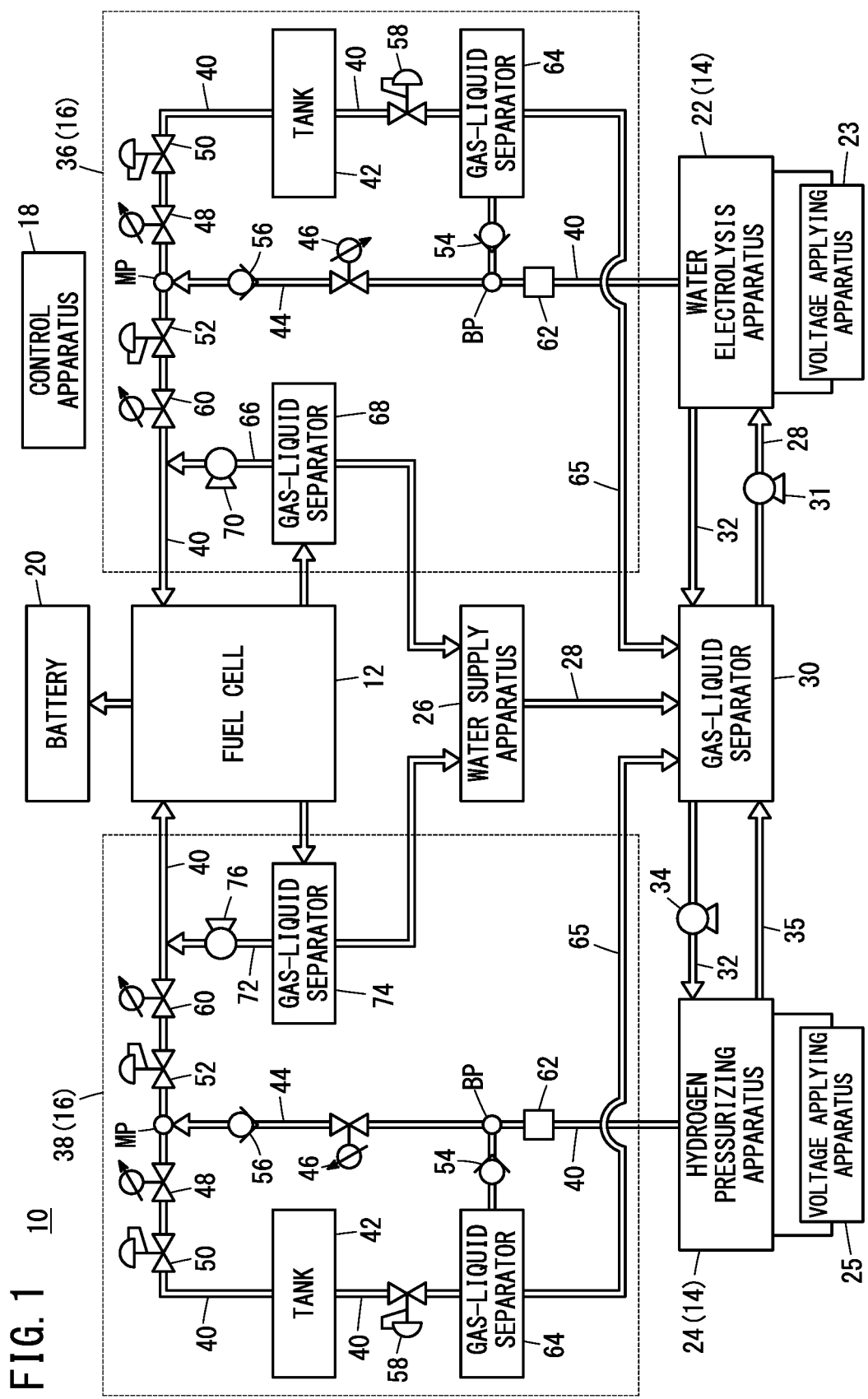
FIG. 1 is a perspective view of a regenerative fuel cell system according to an embodiment.

FIG. 1 is a perspective view of a regenerative fuel cell system 10 according to an embodiment. The regenerative fuel cell system 10 includes a fuel cell 12, a pressurization apparatus 14, a supply mechanism 16, and a control apparatus 18.

The fuel cell 12 generates power through an electrochemical reaction between oxygen gas and hydrogen gas. The fuel cell 12 includes a plurality of unit cells. Each unit cell includes a membrane electrode assembly (MEA) in which an electrolyte membrane is sandwiched between an anode and a cathode. The fuel cell 12 supplies hydrogen gas to the anode of each unit cell. The fuel cell 12 supplies oxygen gas to the cathode of each unit cell. The fuel cell 12 collects the power generated by each unit cell obtained through the electrochemical reaction between the oxygen gas and the hydrogen gas, and accumulates this power in a battery 20.

The fuel cell 12 gathers excess oxygen gas that has not electrochemically reacted with the hydrogen gas, and discharges oxygen-containing exhaust gas that contains this oxygen gas. Most of the oxygen-containing exhaust gas is circulated back to the fuel cell 12 to be reused. Furthermore, the fuel cell 12 gathers excess hydrogen gas that has not electrochemically reacted with the oxygen gas, and discharges hydrogen-containing exhaust gas that contains this hydrogen gas. Most of the hydrogen-containing exhaust gas is circulated back to the fuel cell 12 to be reused.

The pressurization apparatus 14 is an apparatus that generates one of pressurized oxygen gas or pressurized hydrogen gas. The regenerative fuel cell system 10 of the present embodiment includes, as the pressurization apparatus 14, a water electrolysis apparatus 22 and a hydrogen pressurizing apparatus 24. The water electrolysis apparatus 22 is a pressurization apparatus 14 that generates pressurized oxygen gas. The hydrogen pressurizing apparatus 24 is a pressurization apparatus 14 that generates pressurized hydrogen gas.

The water electrolysis apparatus 22 generates pressurized oxygen gas by electrolyzing water. The water is supplied from a water supply apparatus 26, via a water supply path 28. The water supply path 28 is a path for supplying water from the water supply apparatus 26 to the water electrolysis apparatus 22. A gas-liquid separator 30 is provided in the water supply path 28. A pump 31 is provided in the water supply path 28, between the gas-liquid separator 30 and the water electrolysis apparatus 22. The pump 31 supplies water stored in the gas-liquid separator 30 to the water electrolysis apparatus 22.

The water supply apparatus 26 may be a tank capable of storing water, or may be a supply apparatus. In the present embodiment, the water supply apparatus 26 is a tank. In a case where the water supply apparatus 26 is a tank, a pump may be provided in the water supply path 28, between the water supply apparatus 26 and the gas-liquid separator 30.

The water electrolysis apparatus 22 includes a plurality of unit cells. Each unit cell includes a membrane electrode assembly (MEA) in which an electrolyte membrane is sandwiched between an anode and a cathode. The electrolyte membrane used in the water electrolysis apparatus 22 is an anion exchange membrane. A voltage applying apparatus 23 is connected to the anode and the cathode of each unit cell. The voltage applying apparatus 23 is configured to be capable of changing a voltage value of the voltage applied between the anode and the cathode. The voltage applying apparatus 23 may acquire the power source for the voltage applied between the anode and the cathode from the battery 20, or may acquire this power source from a power source apparatus other than the battery 20. Furthermore, the electrolyte membrane used in the water electrolysis apparatus 22 may be a proton exchange membrane.

The water electrolysis apparatus 22 supplies the water that flows therein from the water supply path 28, to the cathode of each unit cell. Each unit cell electrolyzes the water based on the voltage applied by the voltage applying apparatus 23. Due to this, oxygen gas is generated at the anode and hydrogen gas is generated at the cathode. The oxygen gas generated by the water electrolysis apparatus 22 has high pressure. For example, the oxygen gas is compressed to be in a range of 1 MPa to 100 MPa.

The water electrolysis apparatus 22 gathers the oxygen gas generated by the respective unit cells and outputs exhaust gas containing this oxygen gas to the supply mechanism 16. This exhaust gas contains water vapor vaporized by the heat of the water electrolysis apparatus 22 or the like. On the other hand, the water electrolysis apparatus 22 gathers the hydrogen gas generated by the respective unit cells and excess water (unreacted water) that has not been electrolyzed, and outputs exhaust fluid containing this hydrogen gas and this unreacted water to a hydrogen supply path 32. The exhaust fluid contains water vapor vaporized by the heat of the water electrolysis apparatus 22 or the like.

The hydrogen supply path 32 is a path for supplying the hydrogen gas from the water electrolysis apparatus 22 to the hydrogen pressurizing apparatus 24. The hydrogen supply path 32 passes through the gas-liquid separator 30. A pump 34 is provided in the hydrogen supply path 32, between the gas-liquid separator 30 and the hydrogen pressurizing apparatus 24.

The hydrogen gas and the unreacted water output from the water electrolysis apparatus 22 to the hydrogen supply path 32 flow into the gas-liquid separator 30. The gas-liquid separator 30 separates this exhaust fluid into a gas component (hydrogen gas and water vapor) and a liquid component (liquid water). The gas component is supplied to the hydrogen pressurizing apparatus 24 by the pump 34.

The hydrogen pressurizing apparatus 24 pressurizes the hydrogen gas flowing in from the hydrogen supply path 32, to generate the pressurized hydrogen gas. The hydrogen gas flowing in from the hydrogen supply path 32 is hydrogen gas generated by the water electrolysis apparatus 22.

The hydrogen pressurizing apparatus 24 includes a membrane electrode assembly (MEA) in which an electrolyte membrane is sandwiched between an anode and a cathode. The electrolyte membrane used in the hydrogen pressurizing apparatus 24 is a proton exchange membrane. A voltage applying apparatus 25 is connected to the anode and the cathode. The voltage applying apparatus 25 is configured to be capable of changing the voltage value of the voltage applied between the anode and the cathode. The voltage applying apparatus 25 may acquire the power source for the voltage applied between the anode and the cathode from the battery 20, or may acquire this power source from a power source apparatus other than the battery 20.

The hydrogen pressurizing apparatus 24 supplies the hydrogen gas flowing therein from the hydrogen supply path 32, to the anode. The hydrogen pressurizing apparatus 24 ionizes the hydrogen gas based on the voltage applied by the voltage applying apparatus 25. The protons acquired through the ionization of the hydrogen gas are returned to the hydrogen gas by reaching the cathode via the electrolyte membrane (proton exchange membrane). The hydrogen pressurizing apparatus 24 can generate the pressurized hydrogen gas by causing the protons to move from the anode to the cathode. As an example, the hydrogen gas is compressed to be in a range of 1 MPa to 100 MPa. In this way, the hydrogen pressurizing apparatus 24 is an EHC (Electrochemical Hydrogen Compressor) that can compress hydrogen gas electrochemically.

The hydrogen pressurizing apparatus 24 outputs exhaust gas containing the pressurized hydrogen gas to the supply mechanism 16. The exhaust gas contains water vapor vaporized by the heat of the hydrogen pressurizing apparatus 24 or the like. On the other hand, the hydrogen pressurizing apparatus 24 outputs excess hydrogen gas, which is hydrogen gas that has not been ionized, to a hydrogen exhaust path 35. The hydrogen exhaust path 35 is a path for discharging hydrogen gas from the hydrogen pressurizing apparatus 24 to the gas-liquid separator 30.

The supply mechanism 16 is a mechanism for supplying gas to the fuel cell 12. The regenerative fuel cell system 10 of the present embodiment includes, as the supply mechanism 16, an oxygen supply mechanism 36 and a hydrogen supply mechanism 38. The oxygen supply mechanism 36 is the supply mechanism 16 for supplying the oxygen gas generated by the water electrolysis apparatus 22 to the fuel cell 12. The hydrogen supply mechanism 38 is the supply mechanism 16 for supplying the hydrogen gas generated by the hydrogen pressurizing apparatus 24 to the fuel cell 12.

The configuration of the oxygen supply mechanism 36 is basically the same as the configuration of the hydrogen supply mechanism 38. Accordingly, unless otherwise specified, the oxygen supply mechanism 36 and the hydrogen supply mechanism 38 will both be described as the supply mechanism 16.

In the following description, the "supply mechanism 16" refers to either one of the oxygen supply mechanism 36 or the hydrogen supply mechanism 38. Similarly, "gas" refers to either one of the oxygen gas or the hydrogen gas, and the "pressurization apparatus 14" refers to either one of the water electrolysis apparatus 22 or the hydrogen pressurizing apparatus 24.

It should be noted that, when the "supply mechanism 16" is referring to the oxygen supply mechanism 36, the "gas" refers to the oxygen gas and not the hydrogen gas. Furthermore, when the "supply mechanism 16" is referring to the oxygen supply mechanism 36, the "pressurization apparatus 14" refers to the water electrolysis apparatus 22 and not the hydrogen pressurizing apparatus 24. Similarly, when the "supply mechanism 16" is referring to the hydrogen supply mechanism 38, the "gas" refers to the hydrogen gas and not the oxygen gas. Furthermore, when the "supply mechanism 16" is referring to the hydrogen supply mechanism 38, the "pressurization apparatus 14" refers to the hydrogen pressurizing apparatus 24 and not the water electrolysis apparatus 22.

The supply mechanism 16 includes a gas supply path 40, a tank 42, a bypass path 44, a first on-off valve 46, a second on-off valve 48, a first pressure reducing valve 50, a second pressure reducing valve 52, a first check valve 54, a second check valve 56, a back pressure valve 58, a flow regulating valve 60, a pressure sensor 62, and a gas-liquid separator 64.

The gas supply path 40 is a path for supplying gas from the pressurization apparatus 14 to the fuel cell 12. One end of the gas supply path 40 is connected to the pressurization apparatus 14, and the other end of the gas supply path 40 is connected to the fuel cell 12.

The tank 42 is provided on the gas supply path 40. The tank 42 stores the gas generated by the pressurization apparatus 14. This gas is pressurized.

The bypass path 44 branches from the gas supply path 40 between the pressurization apparatus 14 and the tank 42, and merges with the gas supply path 40 between the tank 42 and the fuel cell 12.

The first on-off valve 46 is provided in the bypass path 44. The first on-off valve 46 is configured to be capable of opening and closing. The first on-off valve 46 opens and closes under the control of the control apparatus 18. In the present embodiment, the first on-off valve 46 is a cutoff valve. When an abnormality is detected, the cutoff valve cuts off the bypass path 44, regardless of the control by the control apparatus 18.

The second on-off valve 48 is provided in the gas supply path 40, between a merge portion MP where the bypass path 44 merges with the gas supply path 40, and the tank 42. The second on-off valve 48 is configured to be capable of opening and closing. The second on-off valve 48 opens and closes under the control of the control apparatus 18. In the present embodiment, the second on-off valve 48 is a cutoff valve.

The first pressure reducing valve 50 is provided in the gas supply path 40, between the merge portion MP and the tank 42. The first pressure reducing valve 50 reduces the pressure of the gas supplied from the tank 42.

The second pressure reducing valve 52 is provided in the gas supply path 40, between the merge portion MP and the fuel cell 12. The second pressure reducing valve 52 reduces the pressure of the gas supplied from the first pressure reducing valve 50 or the bypass path 44.

The first check valve 54 is provided in the gas supply path 40, between a branch portion BP where the bypass path 44 branches from the gas supply path 40, and the gas-liquid separator 64. The second check valve 56 is provided in the bypass path 44, between the merge portion MP and the first on-off valve 46.

The back pressure valve 58 is provided in the gas supply path 40, between the branch portion BP and the tank 42. The back pressure valve 58 applies pressure (back pressure) to the pressurization apparatus 14. Due to this, in a case where the pressurization apparatus 14 is the water electrolysis apparatus 22, the pressure of the oxygen gas generated at the anode of each unit cell increases, and becomes higher than the pressure of the hydrogen gas generated at the cathode.

In other words, the water electrolysis apparatus 22 generates oxygen gas at the anode with a higher pressure than the hydrogen gas generated at the cathode. Accordingly, it is possible to restrict crossover by which hydrogen gas passes through the electrolyte membrane from the cathode toward the anode. As a result, it is possible to restrict a decrease of the amount of hydrogen gas supplied from the water electrolysis apparatus 22 to the hydrogen pressurizing apparatus 24.

The flow regulating valve 60 is provided in the gas supply path 40, between the merge portion MP and the fuel cell 12. The flow regulating valve 60 is configured to be capable of adjusting the flow rate of the gas flowing to the fuel cell 12. The flow regulating valve 60 adjusts the flow rate under the control of the control apparatus 18.

The pressure sensor 62 detects the pressure of the gas supplied to the gas supply path 40. The pressure sensor 62 outputs a signal indicating the detected pressure to the control apparatus 18. The pressure sensor 62 is preferably provided in the gas supply path 40, near the water electrolysis apparatus 22. In the present embodiment, the pressure sensor 62 is provided in the gas supply path 40, between the water electrolysis apparatus 22 and the branch portion BP.

The gas-liquid separator 64 is provided in the gas supply path 40, between the back pressure valve 58 and the first check valve 54. As described above, the exhaust gas discharged from the pressurization apparatus 14 to the gas supply path 40 contains water vapor in addition to the gas. The gas-liquid separator 64 supplies the gas within the exhaust gas to the tank 42. Due to this, it is possible to restrict the occurrence of moisture in the tank 42. As a result, it is possible to improve the durability of the tank 42, without making the tank 42 excessively rust resistant.

On the other hand, the gas-liquid separator 64 cools the water vapor in the exhaust gas, to generate liquid water. The gas-liquid separator 64 is connected to the gas-liquid separator 30, via a liquid water supply path 65. The liquid water supply path 65 is a path for supplying the liquid water stored in the gas-liquid separator 64 to the gas-liquid separator 30. The liquid water obtained from the water vapor in the exhaust gas discharged from the water electrolysis apparatus 22 is supplied, via the liquid water supply path 65, to the gas-liquid separator 30, which stores the water to be supplied to the water electrolysis apparatus 22. Accordingly, it is possible to conserve the water used in the water electrolysis apparatus 22.

The oxygen supply mechanism 36 includes, in addition to the configuration of the supply mechanism 16 described above, an oxygen exhaust gas flow path 66, a gas-liquid separator 68, and a circulation pump 70. The oxygen exhaust gas flow path 66 is a path for returning, back to the fuel cell 12, the oxygen-containing exhaust gas discharged from the fuel cell 12. One end of the oxygen exhaust gas flow path 66 is connected to the fuel cell 12. The other end of the oxygen exhaust gas flow path 66 is connected to the gas supply path 40, between the fuel cell 12 and the flow regulating valve 60.

The gas-liquid separator 68 and the circulation pump 70 are provided on the oxygen exhaust gas flow path 66. The gas-liquid separator 68 separates the oxygen-containing exhaust gas discharged from the fuel cell 12 to the oxygen exhaust gas flow path 66, into a gas component (oxygen gas and water vapor) and a liquid component (liquid water). The gas component is supplied back to the fuel cell 12 by the circulation pump 70. On the other hand, the liquid component is supplied to the water supply apparatus 26.

The hydrogen supply mechanism 38 includes, in addition to the configuration of the supply mechanism 16 described above, a hydrogen exhaust gas flow path 72, a gas-liquid separator 74, and a circulation pump 76. The hydrogen exhaust gas flow path 72 is a path for returning, back to the fuel cell 12, the hydrogen-containing exhaust gas discharged from the fuel cell 12. One end of the hydrogen exhaust gas flow path 72 is connected to the fuel cell 12. The other end of the hydrogen exhaust gas flow path 72 is connected to the gas supply path 40, between the fuel cell 12 and the flow regulating valve 60.

The gas-liquid separator 74 and the circulation pump 76 are provided on the hydrogen exhaust gas flow path 72. The gas-liquid separator 74 separates the hydrogen-containing exhaust gas discharged from the fuel cell 12 to the hydrogen exhaust gas flow path 72, into a gas component (hydrogen gas and water vapor) and a liquid component (liquid water). The gas component is supplied back to the fuel cell 12 by the circulation pump 76. On the other hand, the liquid component is supplied to the water supply apparatus 26.

Figure 2:
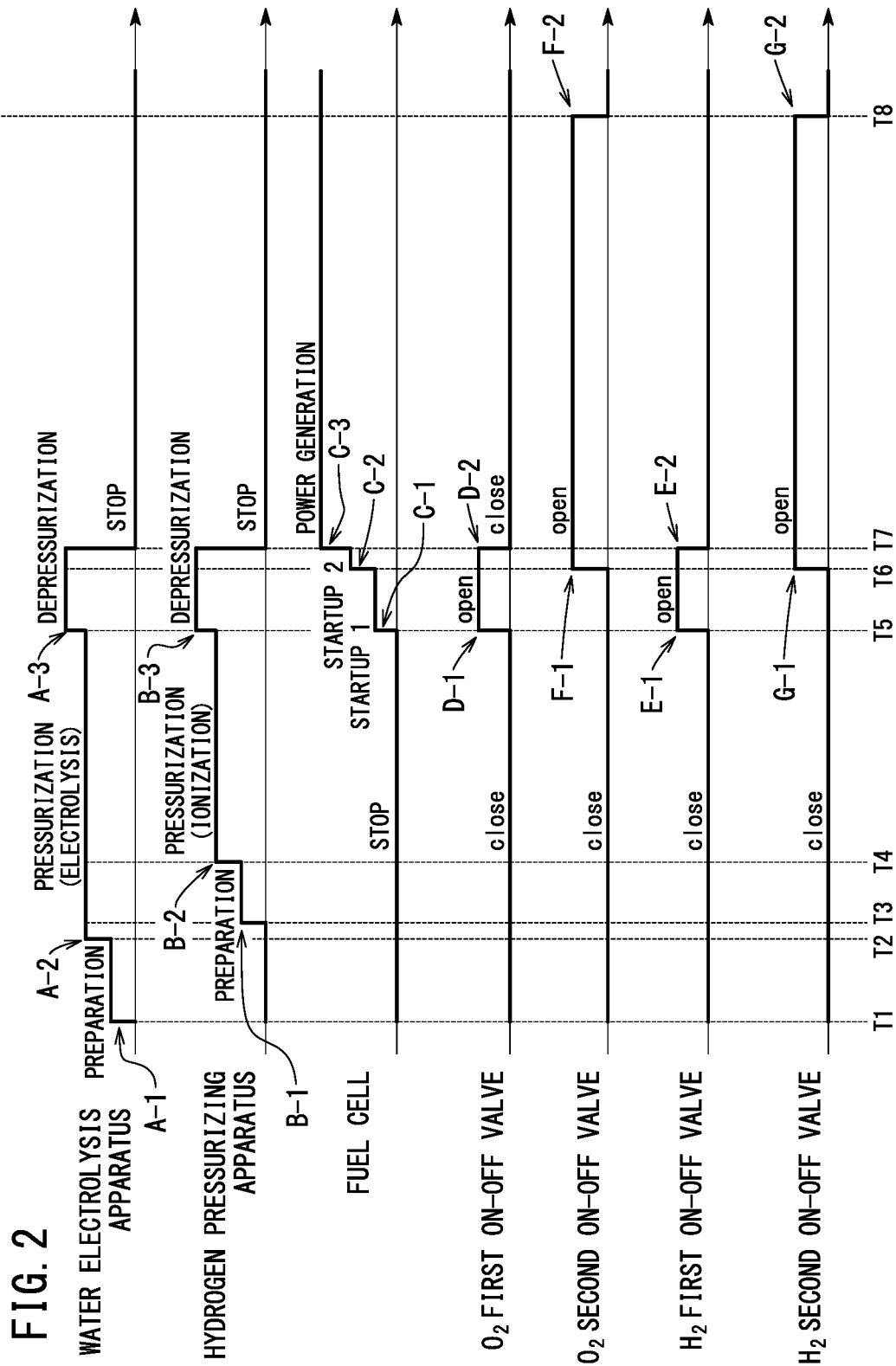
FIG. 2 is a time chart showing an operational sequence performed by a control apparatus of the regenerative fuel cell system.
Figure 3:
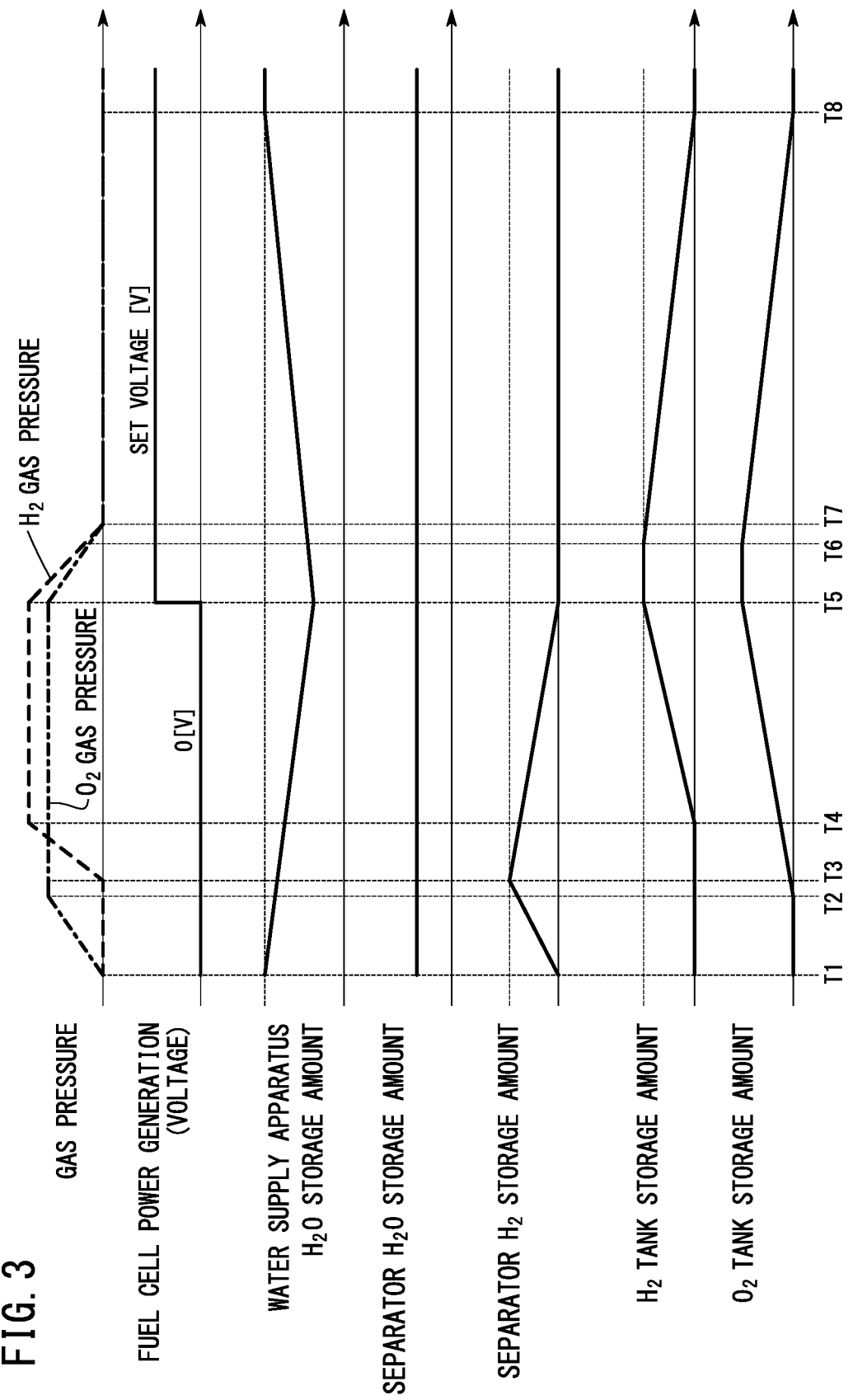
FIG. 3 is a time chart showing the behavior of the oxygen gas, the hydrogen gas, the water, and the generated power in a case where operation is performed according to the operational sequence of FIG. 2.

FIG. 2 is a time chart showing an operational sequence performed by the control apparatus 18 of the regenerative fuel cell system 10. FIG. 3 is a time chart showing the behavior of the oxygen gas, the hydrogen gas, the water, and the generated power in a case where operation is performed according to the operational sequence of FIG. 2. The timing "T1" in FIG. 2 and the timing "T1" in FIG. 3 are the same timing. The same is true for "T2" to "T8" in FIGS. 2 and 3.

Furthermore, in FIG. 2, "$O_2$ first on-off valve" refers to the first on-off valve 46 of the oxygen supply mechanism 36, "$O_2$ second on-off valve" refers to the second on-off valve 48 of the oxygen supply mechanism 36, "$H_2$ first on-off valve" refers to the first on-off valve 46 of the hydrogen supply mechanism 38, and "$H_2$ second on-off valve" refers to the second on-off valve 48 of the hydrogen supply mechanism 38.

Furthermore, in FIG. 3, "$H_2$ gas pressure" refers to the pressure of the hydrogen gas generated by the hydrogen pressurizing apparatus 24, "$O_2$ gas pressure" refers to the pressure of the oxygen gas generated by the water electrolysis apparatus 22, "separator $H_2O$ storage amount" refers to the amount of water stored in the gas-liquid separator 30, "separator $H_2$ storage amount" refers to the amount of hydrogen gas stored in the gas-liquid separator 30, "$H_2$ tank storage amount" refers to the amount of hydrogen gas stored in the tank 42 of the hydrogen supply mechanism 38, and "$O_2$ tank storage amount" refers to the amount of oxygen gas stored in the tank 42 of the oxygen supply mechanism 36.

The operation of the regenerative fuel cell system 10 is executed by the control apparatus 18. The control apparatus 18 performs overall control of the regenerative fuel cell system 10. In a state where the regenerative fuel cell system 10 is stopped, the first on-off valve 46 and second on-off valve 48 of each of the oxygen supply mechanism 36 and hydrogen supply mechanism 38 are closed. Furthermore, the fuel cell 12, the water electrolysis apparatus 22, and the hydrogen pressurizing apparatus 24 are stopped.

When operation of the regenerative fuel cell system 10 is started, first, the control apparatus 18 controls the water supply apparatus 26 to cause the water supply apparatus 26 to start the output of water. The water output from the water supply apparatus 26 is supplied to the cathode of each unit cell of the water electrolysis apparatus 22, via the water supply path 28.

Next, the control apparatus 18 controls the voltage applying apparatus 23 to cause the water electrolysis apparatus 22 to execute a pressurization preparation operation (A-1 of FIG. 2). In this case, the control apparatus 18 supplies a prescribed electrolysis standby current to the cathode and anode of each unit cell of the water electrolysis apparatus 22.

After this, upon entering a state in which the water electrolysis apparatus 22 can generate each of the hydrogen gas and the oxygen gas, the control apparatus 18 causes the water electrolysis apparatus 22 to execute the pressurization operation (A-2 of FIG. 2). In this case, the control apparatus 18 supplies a prescribed electrolysis operation current to the cathode and the anode of each unit cell of the water electrolysis apparatus 22.

When the water electrolysis apparatus 22 starts the pressurization operation, the oxygen gas pressurized due to the electrolysis of the water is generated at the anode. This oxygen gas is supplied to the tank 42 of the oxygen supply mechanism 36, via the gas supply path 40 of the oxygen supply mechanism 36. On the other hand, when the water electrolysis apparatus 22 starts the pressurization operation, the hydrogen gas resulting from the electrolysis of the water is generated at the cathode. This hydrogen gas is supplied to the anode of each unit cell of the hydrogen pressurizing apparatus 24, via the hydrogen supply path 32.

The control apparatus 18 checks the supply of hydrogen gas to the hydrogen supply path 32, based on a sensor or the like disposed in the hydrogen supply path 32 near the hydrogen pressurizing apparatus 24. Upon confirming that the hydrogen gas is being supplied to the hydrogen supply path 32, the control apparatus 18 controls the voltage applying apparatus 25 to cause the hydrogen pressurizing apparatus 24 to execute a pressurization preparation operation (B-1 of FIG. 2). In this case, the control apparatus 18 supplies a prescribed ionization standby current to the cathode and anode of each unit cell of the hydrogen pressurizing apparatus 24.

After this, upon entering a state in which the hydrogen pressurizing apparatus 24 can ionize the hydrogen gas, the control apparatus 18 causes the hydrogen pressurizing apparatus 24 to execute the pressurization operation (B-2 of FIG. 2). In this case, the control apparatus 18 supplies a prescribed ionization operation current to the cathode and anode of each unit cell of the hydrogen pressurizing apparatus 24.

When the hydrogen pressurizing apparatus 24 starts the pressurization operation, pressurized hydrogen gas is generated at the cathode due to the ionization of the hydrogen gas. This hydrogen gas is supplied to the tank 42 of the hydrogen supply mechanism 38, via the gas supply path 40 of the hydrogen supply mechanism 38.

The control apparatus 18 monitors the amount of power accumulated in the battery 20, based on a sensor or the like installed in the battery 20. When the amount of power drops below a prescribed power lower limit value, the control apparatus 18 causes the fuel cell 12 to execute a first startup operation (C-1 of FIG. 2).

Specifically, the control apparatus 18 opens the first on-off valve 46 of the oxygen supply mechanism 36 (D-1 of FIG. 2). Due to this, the supply of oxygen gas from the water electrolysis apparatus 22 to the fuel cell 12 is started. Similarly, the control apparatus 18 opens the first on-off valve 46 of the hydrogen supply mechanism 38 (E-1 of FIG.

2). Due to this, the supply of hydrogen gas from the hydrogen pressurizing apparatus 24 to the fuel cell 12 is started.

When the first on-off valve 46 of the oxygen supply mechanism 36 is opened, the oxygen gas pressurized by the water electrolysis performed by the water electrolysis apparatus 22 is supplied to the fuel cell 12 via the bypass path 44 of the oxygen supply mechanism 36. On the other hand, when the first on-off valve 46 of the hydrogen supply mechanism 38 is opened, the hydrogen gas pressurized by the ionization performed by the hydrogen pressurizing apparatus 24 is supplied to the fuel cell 12 via the bypass path 44 of the hydrogen supply mechanism 38. The fuel cell 12 starts power generation through the electrochemical reaction between the oxygen gas supplied from the oxygen supply mechanism 36 and the hydrogen gas supplied from the hydrogen supply mechanism 38, to obtain power corresponding to the amounts of these gases.

As described above, the exhaust gas discharged from the water electrolysis apparatus 22 to the gas supply path 40 contains water vapor in addition to the oxygen gas. Therefore, water vapor is supplied to the fuel cell 12 along with the oxygen gas. Similarly, the exhaust gas discharged from the hydrogen pressurizing apparatus 24 to the gas supply path 40 contains water vapor in addition to the hydrogen gas. Therefore, water vapor is supplied to the fuel cell 12 along with the hydrogen gas. Accordingly, drying of the electrolyte membrane of the membrane electrode assembly of the fuel cell 12 is restricted, and as a result a decrease in the power generation efficiency of the fuel cell 12 is restricted.

Furthermore, the control apparatus 18 causes the pressurization apparatus 14 to start the pressurization-stop operation. The timing at which the pressurization-stop operation is started may be the same as a startup timing at which the fuel cell 12 is caused to execute the first startup operation, or may be earlier or later than this startup timing. In FIG. 2, the timing at which the pressurization-stop operation is started is the same as the startup timing at which the fuel cell 12 is caused to execute the first startup operation.

In the present embodiment, the control apparatus 18 controls the voltage applying apparatus 23 to cause the water electrolysis apparatus 22 to start the pressurization-stop operation (depressurization operation) (A-3 of FIG. 2). In this case, the control apparatus 18 causes the current supplied to the cathode and anode of each unit cell of the water electrolysis apparatus 22 to gradually decrease. Due to this, the high-pressure oxygen gas generated by the water electrolysis apparatus 22 gradually decreases. Similarly, the control apparatus 18 controls the voltage applying apparatus 25 to cause the hydrogen pressurizing apparatus 24 to start the pressurization-stop operation (depressurization operation) (B-3 of FIG. 2). In this case, the control apparatus 18 causes the current supplied to the cathode and anode of each unit cell of the hydrogen pressurizing apparatus 24 to gradually decrease. Due to this, the high-pressure hydrogen gas generated by the hydrogen pressurizing apparatus 24 gradually decreases.

In a case where the depressurization rate of the high-pressure gas (oxygen gas or hydrogen gas) generated by the pressurization apparatus 14 (water electrolysis apparatus 22 or hydrogen pressurizing apparatus 24) due to the pressurization-stop operation is excessively high, there is a tendency for blisters or the like to occur in the electrolyte membrane of the membrane electrode assembly of the pressurization apparatus 14, thereby causing the pressurization apparatus 14 to deteriorate.

Therefore, the control apparatus 18 adjusts the flow rate of the flow regulating valve 60 to realize a target depressurization rate, based on the pressure detected by the pressure sensor 62, to cause the fuel cell 12 to generate power (generated voltage) corresponding to this flow rate. In this case, the control apparatus 18 measures the depressurization rate per unit time based on the pressure detected by the pressure sensor 62, and calculates the difference between this depressurization rate and the target depressurization rate. The target depressurization rate is a target value of the depressurization rate for restricting the occurrence of blisters or the like, and is set in advance in a memory of the control apparatus 18. The control apparatus 18 sets the flow rate of the flow regulating valve 60 such that the difference with respect to the target depressurization rate becomes smaller. The flow rate of the flow regulating valve 60 is set to be smaller the larger the difference with respect to the target depressurization rate.

Due to this, it is possible to restrict the occurrence of blisters or the like in the electrolyte membrane of the pressurization apparatus 14 caused by the high-pressure gas (oxygen gas or hydrogen gas) supplied from the pressurization apparatus 14 (water electrolysis apparatus 22 or hydrogen pressurizing apparatus 24). As a result, deterioration of the pressurization apparatus 14 is restricted.

The amount of gas supplied to the fuel cell 12 decreases and the gas pressure decreases overtime during the pressurization-stop operation performed by the pressurization apparatus 14. When the pressure detected by the pressure sensor 62 drops below a prescribed pressure threshold value, the control apparatus 18 causes the fuel cell 12 to execute a second startup operation (C-2 of FIG. 2).

Specifically, when the pressure detected by the pressure sensor 62 of the oxygen supply mechanism 36 drops below a prescribed oxygen gas pressure threshold value, the control apparatus 18 opens the second on-off valve 48 of the oxygen supply mechanism 36 (F-1 of FIG. 2). Due to this, the supply of oxygen gas from the tank 42 of the oxygen supply mechanism 36 to the fuel cell 12 is started. Similarly, when the pressure detected by the pressure sensor 62 of the hydrogen supply mechanism 38 drops below a prescribed hydrogen gas pressure threshold value, the control apparatus 18 opens the second on-off valve 48 of the hydrogen supply mechanism 38 (G-1 of FIG. 2). Due to this, the supply of hydrogen gas from the tank 42 of the hydrogen supply mechanism 38 to the fuel cell 12 is started.

Accordingly, even when the amount of gas supplied from the pressurization apparatus 14 to the fuel cell 12 becomes lower over time during the pressurization-stop operation performed by the pressurization apparatus 14, it is possible to realize a stable supply of gas to the fuel cell 12. As a result, a decrease in the power generation efficiency of the fuel cell 12 can be restricted. The pressure threshold value (oxygen gas pressure threshold value or hydrogen gas pressure threshold value) described above is set in advance in a memory of the control apparatus 18.

After this, when the pressure detected by the pressure sensor 62 drops below the prescribed pressure threshold value, the control apparatus 18 causes the fuel cell 12 to execute a power generation operation (C-3 of FIG. 2). In this case, the control apparatus 18 fixes the flow rate of the flow regulating valve 60 at a flow rate value set in advance to realize a prescribed power (generated voltage). In addition to this, the control apparatus 18 closes the first on-off valve 46 and starts supplying gas to the fuel cell 12 only from the tank 42.

Specifically, when the pressure detected by the pressure sensor 62 of the oxygen supply mechanism 36 drops below the oxygen gas pressure threshold value, the control apparatus 18 fixes the flow rate of the flow regulating valve 60 of the oxygen supply mechanism 36 at a prescribed oxygen flow rate value. In addition to this, the control apparatus 18 closes the first on-off valve 46 of the oxygen supply mechanism 36 (D-2 of FIG. 2). Due to this, a stable supply of oxygen gas to the fuel cell 12 from only the tank 42 of the oxygen supply mechanism 36 is started.

Similarly, when the pressure detected by the pressure sensor 62 of the hydrogen supply mechanism 38 drops below the hydrogen gas pressure threshold value, the control apparatus 18 fixes the flow rate of the flow regulating valve 60 of the hydrogen supply mechanism 38 at a prescribed hydrogen flow rate value. In addition to this, the control apparatus 18 closes the first on-off valve 46 of the hydrogen supply mechanism 38 (E-2 of FIG. 2). Due to this, a stable supply of hydrogen gas to the fuel cell 12 from only the tank 42 of the hydrogen supply mechanism 38 is started.

When the first on-off valve 46 is closed, the pressure of the gas supplied from the tank 42 to the fuel cell 12 via the gas supply path 40 is adjusted to a prescribed value by the first pressure reducing valve 50 and the second pressure reducing valve 52 provided in the gas supply path 40. The pressure threshold value (oxygen gas pressure threshold value or hydrogen gas pressure threshold value) described above is set in advance in the memory of the control apparatus 18.

When the amount of power accumulated in the battery 20 through the power generation by the fuel cell 12 exceeds a prescribed power upper limit value, the control apparatus 18 closes the second on-off valves 48 of the oxygen supply mechanism 36 and the hydrogen supply mechanism 38 (F-2 and G-2 of FIG. 2). Due to this, the power generation operation performed by the fuel cell 12 is stopped.

In the manner described above, the control apparatus 18 performs overall control of the regenerative fuel cell system 10 by executing the operational sequence.

It should be noted that there is a tendency for there to be a difference between the depressurization rate of the oxygen gas depressurized according to the pressurization-stop operation of the water electrolysis apparatus 22 and the depressurization rate of the hydrogen gas depressurized according to the pressurization-stop operation of the hydrogen pressurizing apparatus 24. When the oxygen gas depressurization rate and the hydrogen gas depressurization rate are different from each other, the timing at which the pressure of the gas depressurized by the pressurization-stop operation reaches the pressure threshold value described above differs between the oxygen supply mechanism 36 and the hydrogen supply mechanism 38.

Therefore, in the present embodiment, the control apparatus 18 controls the first on-off valves 46 and the second on-off valves 48 such that a difference in the timing at which the pressure threshold value is reached does not occur between the oxygen supply mechanism 36 and the hydrogen supply mechanism 38.

As an example, a case is assumed in which the timing at which the pressure threshold value described above is reached in the oxygen supply mechanism 36 is earlier than the timing at which the pressure threshold value described above is reached in the hydrogen supply mechanism 38. In this case, first, the control apparatus 18 closes the first on-off valve 46 of the oxygen supply mechanism 36 and opens the second on-off valve 48 of the oxygen supply mechanism 36. On the other hand, the control apparatus 18 opens the first on-off valve 46 of the hydrogen supply mechanism 38 and closes the second on-off valve 48 of the hydrogen supply mechanism 38. After this, when the pressure detected by the pressure sensor 62 of the hydrogen supply mechanism 38 drops below the pressure threshold value described above, the control apparatus 18 closes the first on-off valve 46 of the hydrogen supply mechanism 38 and opens the second on-off valve 48 of the hydrogen supply mechanism 38.

In contrast to this, a case is assumed in which the timing at which the pressure threshold value described above is reached in the hydrogen supply mechanism 38 is earlier than the timing at which the pressure threshold value described above is reached in the oxygen supply mechanism 36. In this case, first, the control apparatus 18 closes the first on-off valve 46 of the hydrogen supply mechanism 38 and opens the second on-off valve 48 of the hydrogen supply mechanism 38. On the other hand, the control apparatus 18 opens the first on-off valve 46 of the oxygen supply mechanism 36 and closes the second on-off valve 48 of the oxygen supply mechanism 36. After this, when the pressure detected by the pressure sensor 62 of the oxygen supply mechanism 36 drops below the pressure threshold value described above, the control apparatus 18 closes the first on-off valve 46 of the oxygen supply mechanism 36 and opens the second on-off valve 48 of the oxygen supply mechanism 36.

In this way, the control apparatus 18 opens the second on-off valve 48 of the supply mechanism 16 for which the pressure of the gas depressurized by the pressurization-stop operation reaches the pressure threshold value described above at an earlier timing, to supply gas from the tank 42. After this, when the pressure of the gas in the supply mechanism 16 for which the pressure of the gas depressurized by the pressurization-stop operation reaches the pressure threshold value described above at the later timing reaches the pressure threshold value described above, the control apparatus 18 opens the second on-off valve 48 of this supply mechanism 16. In this way, the difference in timing at which the pressure threshold value described above is reached between the oxygen supply mechanism 36 and the hydrogen supply mechanism 38 is eliminated. Due to this, it is possible to restrict the occurrence of blisters or the like in the electrolyte membrane of the membrane electrode assembly of the pressurization apparatus 14 (water electrolysis apparatus 22 or hydrogen pressurizing apparatus 24), and as a result, the fuel cell 12 can be made to stably generate power.

The present invention is not limited to the above disclosure, and various modifications are possible without departing from the essence and gist of the present invention.

As an example, one of the water electrolysis apparatus 22 or the hydrogen pressurizing apparatus 24 need not be provided. In a case where the hydrogen pressurizing apparatus 24 is not provided, instead of the hydrogen pressurizing apparatus 24 and the hydrogen supply mechanism 38, a hydrogen supply unit that is configured to be capable of supplying the fuel cell 12 with depressurized hydrogen gas may be connected to the fuel cell 12. In contrast to this, in a case where the water electrolysis apparatus 22 is not provided, instead of the water electrolysis apparatus 22 and the oxygen supply mechanism 36, an oxygen supply unit that is configured to be capable of supplying the fuel cell 12 with depressurized oxygen gas may be connected to the fuel cell 12.

The invention and effects that can be understood from the above description will be described below.

(1) The present invention is the regenerative fuel cell system (10) including the fuel cell (12) that generates power through an electrochemical reaction between oxygen gas and hydrogen gas, the regenerative fuel cell comprising: the pressurization apparatus (14) that generates gas from among the oxygen gas having been pressurized and the hydrogen gas having been pressurized; the supply mechanism (16) for supplying the gas to the fuel cell; and the control apparatus (18), wherein the supply mechanism includes: the gas supply path (40) for supplying the gas from the pressurization apparatus to the fuel cell; the flow regulating valve (60) provided in the gas supply path; and the pressure sensor (62) that detects pressure of the gas supplied to the gas supply path, and when the pressurization-stop operation performed by the pressurization apparatus is started, the control apparatus adjusts the flow rate of the flow regulating valve based on the pressure to realize a target depressurization rate, and causes the fuel cell to generate power corresponding to the flow rate.

Due to this, it is possible to cause the fuel cell to generate power while restricting the occurrence of blisters in the pressurization apparatus. As a result, deterioration of the pressurization apparatus can be restricted. Furthermore, the gas generated during the pressurization-stop operation can be output to the gas supply path along with water vapor. Accordingly, water vapor can be supplied to the fuel cell along with the gas. As a result, it is possible to restrict deterioration of the fuel cell due to a lack of moisture.

(2) The regenerative fuel cell system of the present invention may further comprise: the water electrolysis apparatus (22), which is the pressurization apparatus that generates the oxygen gas pressurized through decomposition of water; and the oxygen supply mechanism (36), which is the supply mechanism for supplying the oxygen gas generated by the water electrolysis apparatus, the water electrolysis apparatus may include the membrane electrode assembly in which the electrolyte membrane is sandwiched between the anode and the cathode, may generate the hydrogen gas at the cathode, and may generate the oxygen gas with higher pressure than the hydrogen gas at the anode. Due to this, it is possible to restrict crossover by which the hydrogen gas passes through the electrolyte membrane from the cathode toward the anode. As a result, in the water electrolysis apparatus, it is possible to improve the generation efficiency of the hydrogen gas and the oxygen gas.

(3) The regenerative fuel cell system of the present invention may further comprise: the hydrogen pressurizing apparatus (24), which is the pressurization apparatus that pressurizes the hydrogen gas generated by the water electrolysis apparatus; and the hydrogen supply mechanism (38), which is the supply mechanism for supplying the hydrogen gas generated by the hydrogen pressurizing apparatus. Due to this, the hydrogen gas generated by the water electrolysis apparatus can be used effectively without being discharged as exhaust.

(4) In the regenerative fuel cell system of the present invention, the supply mechanism may include: the tank (42) that is provided on the gas supply path and stores the gas pressurized by the pressurization apparatus; the bypass path (44) that branches from the gas supply path between the pressurization apparatus and the tank, and merges with the gas supply path between the tank and the fuel cell; the first on-off valve (46) provided in the bypass path; and the second on-off valve (48) provided in the gas supply path, between the tank and the merge portion (MP) where the bypass path merges with the gas supply path, the flow regulating valve may be provided in the gas supply path, between the merge portion and the fuel cell, when the pressurization operation is being performed by the pressurization apparatus, the control apparatus may close the first on-off valve and the second on-off valve to supply the gas from the pressurization apparatus to the tank, and, after the pressurization-stop operation is started, the control apparatus may open the first on-off valve to supply the gas from the pressurization apparatus to the fuel cell. Due to this, the hydrogen gas can be stored in the tank in a high-pressure state, and as a result, the fuel cell can be made to operate for a longer time. Furthermore, it is possible to supply the fuel cell with the gas generated during the pressurization-stop operation simply by cutting off the supply and exhaust of gas with the first on-off valve and the second on-off valve.

(5) The regenerative fuel cell system of the present invention may further comprise the gas-liquid separator (64) provided in the gas supply flow path, between the tank and the branch portion (BP) where the bypass path branches from the gas supply path, the gas-liquid separator being configured to separate water vapor contained in the gas from the gas. Due to this, it is possible to restrict moisture in the tank. As a result, the durability of the tank can be improved without making the tank excessively rust resistant.

(6) In the regenerative fuel cell system of the present invention, among the oxygen supply mechanism and the hydrogen supply mechanism, the control apparatus may open the second on-off valve of the supply mechanism for which a timing at which the pressure of the gas depressurized by the pressurization-stop operation reaches a prescribed pressure threshold value is earlier, and when the pressure of the gas in the supply mechanism for which the timing is later reaches the prescribed pressure threshold value, the control apparatus may open the second on-off valve of the supply mechanism for which the timing is later. Due to this, both the pressure of the oxygen gas and the pressure of the hydrogen gas can be reliably reduced to be less than or equal to a prescribed value. As a result, it is possible to restrict the occurrence of blisters in the pressurization apparatus.

The invention claimed is:

1. A regenerative fuel cell system including a fuel cell configured to generate power through an electrochemical reaction between oxygen gas and hydrogen gas, the regenerative fuel cell system comprising:
a pressurization apparatus configured to generate gas from among the oxygen gas having been pressurized and the hydrogen gas having been pressurized;
a supply mechanism configured to supply the gas to the fuel cell; and
a control apparatus, wherein
the supply mechanism includes:
a gas supply path configured to supply the gas from the pressurization apparatus to the fuel cell;
a flow regulating valve provided in the gas supply path; and
a pressure sensor configured to detect pressure of the gas supplied to the gas supply path, and
when a pressurization-stop operation performed by the pressurization apparatus is started, the control apparatus adjusts a flow rate of the flow regulating valve based on the pressure to realize a target depressurization rate, and causes the fuel cell to generate power corresponding to the flow rate.

2. The regenerative fuel cell system according to claim 1, further comprising:
a water electrolysis apparatus, which is the pressurization apparatus configured to generate the oxygen gas pressurized through decomposition of water; and an oxygen supply mechanism, which is the supply mechanism configured to supply the oxygen gas generated by the water electrolysis apparatus, wherein the water electrolysis apparatus includes a membrane electrode assembly in which an electrolyte membrane is sandwiched between an anode and a cathode, the water electrolysis apparatus generating the hydrogen gas at the cathode, and generating the oxygen gas with higher pressure than the hydrogen gas at the anode.

3. The regenerative fuel cell system according to claim 2, further comprising:

a hydrogen pressurizing apparatus, which is the pressurization apparatus configured to pressurize the hydrogen gas generated by the water electrolysis apparatus; and a hydrogen supply mechanism, which is the supply mechanism configured to supply the hydrogen gas generated by the hydrogen pressurizing apparatus.

4. The regenerative fuel cell system according to claim 1, wherein the supply mechanism includes:

a tank provided on the gas supply path and configured to store the gas pressurized by the pressurization apparatus;

a bypass path that branches from the gas supply path between the pressurization apparatus and the tank, and merges with the gas supply path between the tank and the fuel cell;

a first on-off valve provided in the bypass path; and a second on-off valve provided in the gas supply path, between the tank and a merge portion where the bypass path merges with the gas supply path, the flow regulating valve is provided in the gas supply path, between the merge portion and the fuel cell, when a pressurization operation is being performed by the pressurization apparatus, the control apparatus closes the first on-off valve and the second on-off valve to supply the gas from the pressurization apparatus to the tank, and after the pressurization-stop operation is started, the control apparatus opens the first on-off valve to supply the gas from the pressurization apparatus to the fuel cell.

5. The regenerative fuel cell system according to claim 4, further comprising a gas-liquid separator provided in the gas supply flow path, between the tank and a branch portion where the bypass path branches from the gas supply path, the gas-liquid separator being configured to separate water vapor contained in the gas from the gas.

6. The regenerative fuel cell system according to claim 1, further comprising:

a water electrolysis apparatus, which is the pressurization apparatus configured to generate the oxygen gas pressurized through decomposition of water;

an oxygen supply mechanism, which is the supply mechanism configured to supply the oxygen gas generated by the water electrolysis apparatus;

a hydrogen pressurizing apparatus, which is the pressurization apparatus configured to pressurize the hydrogen gas generated by the water electrolysis apparatus; and a hydrogen supply mechanism, which is the supply mechanism configured to supply the hydrogen gas generated by the hydrogen pressurizing apparatus, wherein the oxygen supply mechanism and the hydrogen supply mechanism each include:

a tank provided on the gas supply path and configured to store the gas pressurized by the pressurization apparatus;

a bypass path that branches from the gas supply path between the pressurization apparatus and the tank, and merges with the gas supply path between the tank and the fuel cell;

a first on-off valve provided in the bypass path; and a second on-off valve provided in the gas supply path, between the tank and a merge portion where the bypass path merges with the gas supply path, and among the oxygen supply mechanism and the hydrogen supply mechanism, the control apparatus opens the second on-off valve of the supply mechanism for which a timing at which the pressure of the gas depressurized by the pressurization-stop operation reaches a prescribed pressure threshold value is earlier, and when the pressure of the gas in the supply mechanism for which the timing is later reaches the prescribed pressure threshold value, the control apparatus opens the second on-off valve of the supply mechanism for which the timing is later.

\* \* \* \* \*